United States Patent
Paganelli et al.

(10) Patent No.: US 9,755,254 B2
(45) Date of Patent: Sep. 5, 2017

(54) PROCEDURE FOR DETECTING THE STATE OF PERMEABILITY OF THE ION EXCHANGE POLYMER MEMBRANE OF A FUEL CELL

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Gino Paganelli, Clermont-Ferrand (FR); Lionel Fragniere, Clermont-Ferrand (FR)

(73) Assignee: CAMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 14/651,767

(22) PCT Filed: Nov. 29, 2013

(86) PCT No.: PCT/EP2013/075046
§ 371 (c)(1),
(2) Date: Jun. 12, 2015

(87) PCT Pub. No.: WO2014/090595
PCT Pub. Date: Jun. 19, 2014

(65) Prior Publication Data
US 2015/0325871 A1    Nov. 12, 2015

(30) Foreign Application Priority Data
Dec. 14, 2012 (FR) ..................... 12 62069

(51) Int. Cl.
*H01M 8/04* (2016.01)
*H01M 8/04223* (2016.01)
(Continued)

(52) U.S. Cl.
CPC ... *H01M 8/04231* (2013.01); *H01M 8/04238* (2013.01); *H01M 8/04552* (2013.01); *H01M 8/04671* (2013.01); *H01M 2008/1095* (2013.01)

(58) Field of Classification Search
CPC ......... H01M 8/04231; H01M 8/04238; H01M 8/04671; H01M 8/04552; H01M 2008/1095; Y02E 60/50
(Continued)

(56) References Cited

U.S. PATENT DOCUMENTS

2003/0039869 A1*  2/2003  Murakami ........ H01M 8/04552
                                                     429/429
2004/0124843 A1   7/2004  Hamada et al. .............. 324/434
(Continued)

FOREIGN PATENT DOCUMENTS

WO    WO 2011/051338 A1    5/2011
WO    WO 2011/051341 A1    5/2011

*Primary Examiner* — Gary Harris
(74) *Attorney, Agent, or Firm* — Fitzpatrick, Cella, Harper & Scinto

(57) ABSTRACT

An automated method or procedure for detecting a permeability state of a membrane of a fuel cell stack is provided. The procedure is sensitive enough to detect a defective membrane, and is accurate enough to enable correct maintenance of the fuel cell stack. The fuel cell stack is formed of a stack of electrochemical cells each having an anode and a cathode sandwiching a polymeric ion-exchange membrane therebetween. The fuel cell stack includes a fuel gas supply system on the anode side of the electrochemical cells, and includes an oxidant gas supply system on the cathode side of the electrochemical cells.

6 Claims, 4 Drawing Sheets

(51) Int. Cl.
    *H01M 8/04537*    (2016.01)
    *H01M 8/04664*    (2016.01)
    *H01M 8/1018*     (2016.01)

(58) Field of Classification Search
    USPC .......................................................... 429/429
    See application file for complete search history.

(56) References Cited

U.S. PATENT DOCUMENTS

| | | |
|---|---|---|
| 2012/0237843 A1 | 9/2012 | Paganelli et al. ............. 429/429 |
| 2012/0270127 A1 | 10/2012 | Paganelli ....................... 429/429 |
| 2012/0308906 A1* | 12/2012 | Paganelli .......... H01M 8/04097 |
| | | 429/415 |
| 2014/0300367 A1 | 10/2014 | Paganelli et al. ............. 324/434 |

* cited by examiner

PROCEDURE FOR DETECTING THE STATE OF PERMEABILITY OF THE ION EXCHANGE POLYMER MEMBRANE OF A FUEL CELL

FIELD OF THE INVENTION

The present invention relates to fuel cell stacks, in particular, but not exclusively, to fuel cell stacks of the type having an electrolyte in the form of a polymeric membrane (i.e. of the PEFC (polymer electrolyte fuel cell) type).

PRIOR ART

It is known that fuel cell stacks produce electrical energy directly via an electrochemical redox reaction using hydrogen (the fuel) and oxygen (the oxidant) without passing via a mechanical energy conversion step. This technology seems promising, especially for motor vehicle applications. A fuel cell stack comprises in general the series combination of unitary elements each consisting essentially of an anode and a cathode separated by a polymeric membrane allowing ions to pass from the anode to the cathode.

It is very useful to have permanently available a precise evaluation of the permeability of the ion-exchange membrane of each cell of a fuel cell stack so as to monitor its state of ageing and thus to be able to stop the use thereof if safety were to be compromised. Although the principle of measuring the permeability of an ion-exchange membrane by pressure difference is conventional, in practice only investigatory methods are known that dictate the use of appropriate equipment and a manual procedure. For example, an external nitrogen bottle is used which is connected to one of the circuits, either the anode or the cathode circuit, and the loss of gas to the other circuit is observed.

Patent application US 2004/124843 provides a method for determining the individual permeability of each ion-exchange membrane of a fuel cell stack. To do so, the anode is supplied with hydrogen and the cathode is supplied with nitrogen or with another inert gas. According to the Nernst equation, the difference in nature of the gas on either side of the membrane generates a potential difference that depends inter alia on the nature and the concentration or partial pressure of these gases. It appears that if a membrane is particularly permeable, the hydrogen will diffuse on the cathode side, and vice versa, thus modifying the nature of the gas mixture on either side of the membrane and consequently the potential difference measured on this cell. This method entails a voltage measurement, a measurement of the pressure within the anode circuit and of the pressure within the cathode circuit and a temperature measurement in order to solve the Nernst equation, so as to detect whether one or more membranes mounted within a fuel cell stack have a permeability defect.

However, this method has the following implementation difficulties:
the theoretical potential difference with pure hydrogen at the anode and pure nitrogen at the cathode is at most a few tens of mV, which implies a very accurate voltage measurement apparatus;
determination of the permeability involves flow rate measurements, which in practice are difficult to carry out with great precision for gas mixtures;
the slightest trace of residual oxygen at the cathode may generate a voltage difference much higher than the expected voltage level and therefore falsify the measurement, yet it is well known that in practice it is very difficult to guarantee complete disappearance of a gas, most particularly in the presence of an absorbent support such as the GDL (gas diffusion layer) contained in the membranes; and
finally, this method involves a particular way of conditioning the system and requires a source of nitrogen or another inert gas being available. The method is therefore difficult to automate, most particularly in the context of onboard applications.

Also known, from patent application EP 2 494 644, is a procedure for automatically measuring the permeability state of the membranes of a fuel cell stack by observation of the pressure-balancing dynamic behaviour, on either side of the membranes. However, the permeability measurement carried out within this context is an overall measurement, having 2 major drawbacks:
the measurement is not sensitive enough to detect a small leak over a single membrane in a large stack, and
the measurement does not make it possible to identify which membrane has a permeability defect, which proves to be quite obstructive for the maintenance.

The present invention thus aims to overcome the aforementioned drawbacks.

BRIEF DESCRIPTION OF THE INVENTION

Thus, the present invention aims to propose an automated procedure for detecting the permeability state of one or more membranes of a fuel cell stack, that is sensitive enough to detect any leak, and accurate enough to enable correct maintenance of the fuel cell stack.

The present invention therefore relates to a procedure for detecting the permeability state of at least one polymeric ion-exchange membrane of a fuel cell stack, the fuel cell stack being formed by a stack of electrochemical cells each having an anode and a cathode on either side of a polymeric ion-exchange membrane, the fuel cell stack having a fuel gas supply system on the anode side of the electrochemical cells and an oxidant gas supply system on the cathode side of the electrochemical cells.

The procedure consists, upon each shutdown of the fuel cell stack, in:
continuously measuring the residual voltage at the terminals of at least one cell of the stack,
measuring the time between the shutdown of the fuel cell stack and the moment that the residual voltage measured drops below a predetermined voltage value,
recording the time measured, and comparing it:
to the time measured for the previous shutdowns, and
to the time measured for the same shutdown, for other cells of the fuel cell stack
if the difference between the time measured and one of these two values becomes greater than a predetermined threshold, activating a warning signal that indicates that the fuel cell stack requires an inspection.

In one preferred embodiment, each shutdown of the fuel cell stack is carried out according to the following steps:
(i) the supply of fuel gas and oxidant gas is cut off,
(ii) current continues to be drawn as long as an appropriate indicator indicates that the oxidant gas in the oxidant gas supply system has not been sufficiently consumed,
(iii) nitrogen-enriched gas is injected into the oxidant gas supply system.

The use of such a shutdown procedure makes it possible to create ideal conditions for a reliable and non-intrusive permeability measurement. Indeed, this shutdown procedure makes it possible to automatically obtain the type of gas desired, namely pure hydrogen at the anode and pure nitrogen at the cathode, the pressure of these gases moreover being controlled. Thus, this shutdown procedure guarantees the complete absence of oxygen at the cathode, which makes it possible to prevent any unwanted polarization of the fuel cell stack during the permeability measurement. It is specified here that, throughout the application, the terms "shutdown" and "extinction" are synonymous as regards a fuel cell stack.

Furthermore, the shutdown procedure described here enables a good homogenization of the residual gases, and also a continuous control of the temperature and humidity of the gases, and also of the components of the fuel cell stack. The continuous control of the temperature and of the humidity makes it possible to guarantee constant conditions for the permeability measurement.

Thus, and to summarize, such a shutdown procedure makes it possible to leave the fuel cell stack, upon each shutdown, under the following conditions:
  hydrogen at the anode and nitrogen at the cathode,
  complete absence of oxygen at the cathode,
  homogenization of the gases present at the anode and at the cathode, and
  constant temperature, humidity and pressures.

The repeatability of these conditions upon each shutdown enables the permeability measurement according to the invention to be automated. Moreover, the present invention makes it possible to carry out a permeability measurement without an external gas supply, or associated flow rate control. Indeed, the measurement is carried out by taking advantage of the residual gas trapped in the anode and cathode circuits of the fuel cell stack at the end of the extinction procedure.

At the end of the shutdown procedure, one exemplary embodiment of which has just been described, a residual voltage remains at the terminals of the cells of the fuel cell stack. It is recalled here that a cell of the fuel cell stack is formed of an anode, a cathode and a polymeric ion-exchange membrane. The residual voltage has a tendency to decrease as the gases present respectively at the anode (hydrogen) and the cathode (nitrogen) mix together by diffusion through the membrane. When an identical gas mixture is formed on both sides of the membrane, the residual voltage at the terminals of the cell is cancelled out. Yet, the more permeable the membrane, the more the mixture tends to homogenize rapidly. Thus, it results therefrom that the dynamic behaviour whereby the voltage of a cell decreases is representative of the permeability state of its membrane. Thus, by measuring this dynamic behaviour, more specifically by measuring the time between the shutdown of the fuel cell stack and the moment when the residual voltage at the terminals is cancelled out, important information regarding the permeability state of the membrane is obtained.

This information is utilized in the manner described in the present application, and will be described in detail below, with the aid of the figures.

It should be noted that, as mentioned above, it is useful for the fuel cell stack to be under optimal conditions in order to carry out a reliable permeability measurement. These optimal conditions are, for example, obtained by shutting down the fuel cell stack according to the shutdown procedure described above. However, it is possible for this shutdown procedure to be implemented even if the fuel cell stack has not attained its nominal operating conditions. In this case, the conditions at the end of the shutdown may not be correct for carrying out a permeability measurement.

In order to overcome this drawback, in one preferred embodiment of the invention, a controller of the fuel cell stack activates a signal so that the automatic permeability measurement is not activated, or is not taken into account, when the fuel cell stack is not under nominal operating conditions before the shutdown, as described in the paragraph above.

Furthermore, in one advantageous embodiment, the anode and cathode gas supply circuits of the fuel cell stack are closed before carrying out a residual voltage measurement, this being in order to prevent any exchange of gas with the ambient medium or with the gas tanks connected to the fuel cell stack. Indeed, such exchanges would risk falsifying the permeability measurement.

Generally, a procedure according to the invention has the advantage, besides the aspects mentioned above, of not requiring any equipment, facility or procedure that is not already necessary for the normal operation of the fuel cell stack. Moreover, it is observed that the measurement may be carried out completely automatically and imperceptibly for the user, without any disassembly or special preparation after each extinction of the fuel cell stack. The present invention is therefore particularly advantageous in terms of costs, ergonomics of use and installation time.

The present invention is also advantageous in terms of efficacy. Indeed, it is known that, in a motor vehicle application, a fuel cell stack undergoes at least 15 000 startup-shutdown cycles. The present invention, via the automation of the permeability measurement after each extinction of the fuel cell stack, makes it possible to monitor the change in the permeability throughout the life of the fuel cell stack. For this, in one preferred embodiment, the procedure according to the invention is carried out in a fuel cell stack having a controller that remains powered for a few minutes after extinction of the fuel cell stack. In the case of a fuel cell stack installed in a vehicle, this power supply is made possible for example owing to an auxiliary battery of the vehicle.

BRIEF DESCRIPTION OF THE FIGURES

Other objectives and advantages of the invention will become clearly apparent in the following description of a preferred but non-limiting embodiment, illustrated by the following figures in which.

DESCRIPTION OF THE BEST EMBODIMENT OF THE INVENTION

For safety reasons, fuel cell stacks are generally equipped with a hydrogen cut-off valve which remains closed during shutdowns. In this case, it is not possible to draw hydrogen into the tank during the extinction procedure. The shutdown procedure must therefore be carried out with only the residual hydrogen in the channels, ducts, internal dehumidifying reservoirs and other components of the supply line going from the safety valve to the actual fuel cell stack, these components being denoted hereafter in general as the supply circuit for the fuel cell stack.

Figure 1:
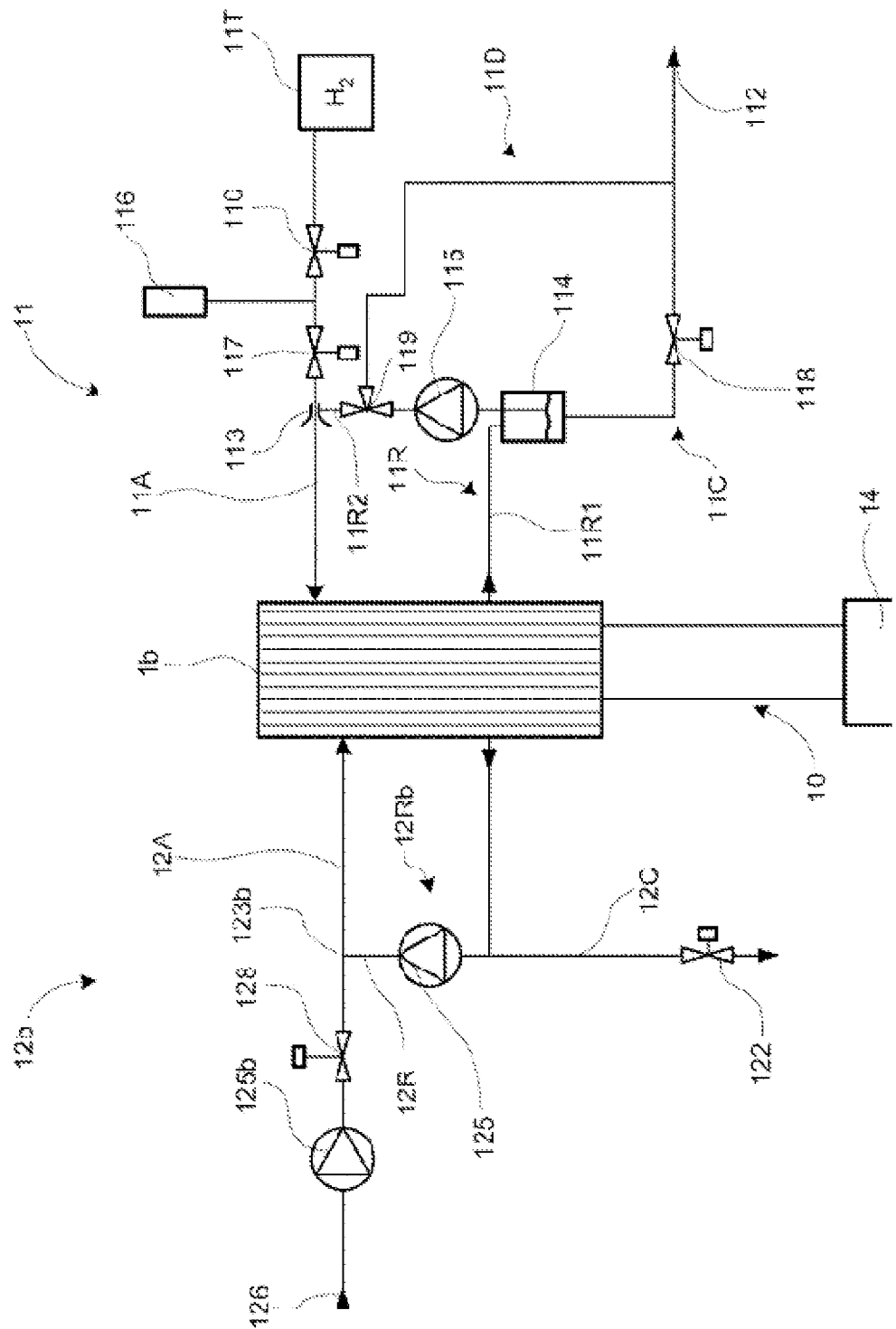
FIG. 1 is a diagram of a fuel cell stack according to the invention in which a procedure according to the invention is carried out.
Figure 2:
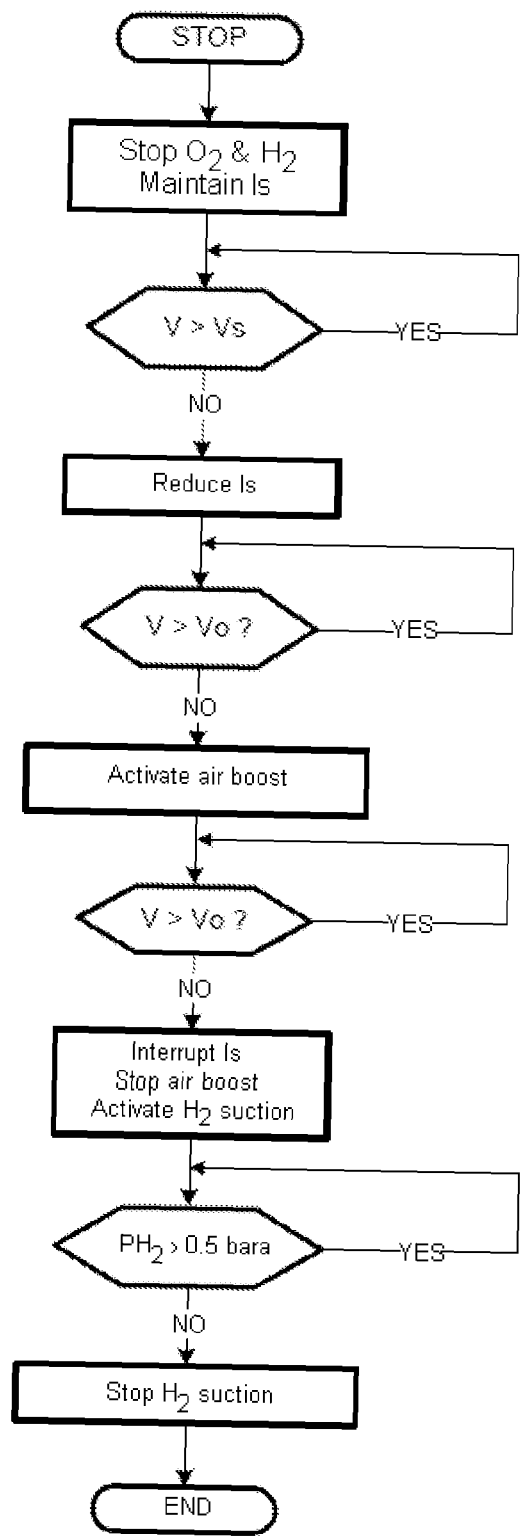
FIG. 2 shows a shutdown procedure flow chart used for the implementation of a procedure according to the invention.

FIG. 1 shows a fuel cell stack 1b of the type having an electrolyte in the form of a polymeric membrane (i.e. of the PEFC (polymer electrolyte fuel cell) or PEM (proton exchange membrane) type). The fuel cell stack 1b is supplied with two gases, namely the fuel (hydrogen stored or generated on board the vehicle) and the oxidant (air or pure oxygen), which gases supply the electrodes of the electrochemical cells. An electrical load 14 is connected to the fuel cell stack 1b via an electrical line 10. To simplify matters, FIG. 1 shows only the gas circuit components useful for understanding an extinction procedure as represented in FIG. 2, described below.

Description of the Anode Circuit:

The installation comprises a fuel gas supply circuit 11 on the anode side. A pure hydrogen ($H_2$) tank 11T is visible, this being connected to the inlet of the anode circuit of the fuel cell stack 1b by means of a supply line that passes via a cut-off valve 110, then via a pressure regulating valve 117, then via an ejector 113 and then via a fuel gas supply channel 11A terminating at the anodes. A pressure probe (not represented) is installed in the supply channel 11A just before the inlet into the fuel cell stack 1b. Forming part of the hydrogen (fuel) supply circuit 11 is a circuit 11R for recycling the hydrogen not consumed by the fuel cell stack, said circuit being connected to the outlet of the anode circuit of the fuel cell stack 1b. A water separator 114 is installed in the recycling circuit 11R. The ejector 113 and a recirculating pump 115 recycle the unconsumed hydrogen and mix it with fresh hydrogen coming from the tank.

An additional fuel gas accumulation chamber 116 is also visible, this being placed on the piping of the fuel gas supply circuit 11, between the cut-off valve 110 and a pressure regulating valve 117. The additional accumulation chamber is, in this preferred embodiment, placed at the point where the pressure is highest in the supply circuit, so as to lessen the volume thereof or, for the same volume, to stock a larger amount of hydrogen. It should be noted that the additional fuel gas accumulation chamber 116 could be placed at any point in the fuel gas supply circuit, that is to say at any point between the cut-off valve 110 and the fuel cell stack 1b, even in the recycling circuit 11R or in the circuit between the water separator 114 and the ejector 113. However, it is advantageous to place it at a point in the circuit where the pressure is higher, so as to reduce the volume thereof. Moreover, the position upstream of the pressure regulating valve makes a controlled discharge of said accumulation chamber possible.

A suction pump 119 and a cut-off valve 118 that are installed on a line venting to the atmosphere and connected to the fuel gas recycling loop 11R, preferably below the water separator 114, can also be seen. The connection at this precise point, shown in FIG. 1, makes it possible, by controlling the cut-off valve 118, to provide three functions, namely water discharging, purging and hydrogen suction. However, this embodiment detail is not limiting. To provide the hydrogen suction function, the line having the cut-off valve 118 could be connected to at any point downstream of the pressure regulating valve 117.

Description of the Cathode Circuit:

The installation also comprises an oxidant gas supply circuit 12b on the cathode side. This circuit comprises an air compressor 125b used, in normal use, to supply the fuel cell stack with atmospheric air 126 by means of a supply line that passes via a cut-off valve 128, then via an oxidant gas supply channel 12A terminating at the cathodes. Forming part of the air supply circuit 12, that contains oxygen, is a circuit 12R for recycling the oxygen not consumed by the fuel cell stack, connected to the outlet of the cathode circuit of the fuel cell stack 1b. The recycling circuit 12Rb is directly connected to the supply line 12A via a branch connection 123b downstream of the air compressor 125b. A pressure regulating valve 122 enables, in normal operation, depleted air to continuously escape to the atmosphere. The degree of opening of this pressure regulating valve 122 is controlled in order to maintain the pressure at the desired value in the cathode circuit.

In normal operation of the fuel cell stack, the recycling circuit is not used, the pump 125 is shut down, and no gas circulates in the recycling circuit 12Rb which becomes virtually non-existent. All of the gas not consumed by the cathode circuit is vented to the atmosphere through the pressure regulating valve 122b. In the case where the pump 125 does not naturally carry out the non-return function when it is shut down, it is necessary to provide a non-return valve in the recycling circuit 12Rb so as to guarantee the flow of all of the air supplied by the compressor to the cathode circuit of the fuel cell stack 1b.

The cut-off valve 128 makes it possible to isolate the cathode circuit from the atmospheric air when the fuel cell stack is shut down. This cut-off valve 128 may either be placed upstream or downstream of the compressor.

An example of a shutdown procedure of the fuel cell stack, that makes it possible to shut down the fuel cell stack before implementation of a procedure according to the invention, is described below. It makes it possible to extinguish the fuel cell stack so as to guarantee storage with a mixture of hydrogen and nitrogen therein, without requiring a nitrogen tank.

This shutdown procedure is essentially made up of 3 phases:

$1^{st}$ phase: residual oxygen consumption phase, which occurs upon cutting off the fuel gas supply and oxidant gas supply, and by drawing a current $I_s$ at the terminals of the fuel cell stack. This current draw $I_s$ is maintained as long as an appropriate indicator indicates that the oxidant gas in the oxidant gas supply system has not been sufficiently consumed. An appropriate indicator is for example the voltage present at the terminals of the fuel cell stack;

$2^{nd}$ phase: neutralization phase that occurs when filling the cathode circuit with nitrogen. In the embodiment described here, the nitrogen is that of the atmospheric air. Forced injection of atmospheric air thus takes place, thereby again introducing a little oxygen, the consumption of which must be controlled by drawing a current;

$3^{rd}$ phase, which is optional, during which, after the production of electricity has been completely shut down, any excess fuel gas is forcibly removed (here, forced suction of the excess hydrogen). It should be emphasized that this suction takes place only after the fuel cell stack has been brought to a state in which the precautions for avoiding insufficient supply of hydrogen, the serious consequences of which are known, have been taken.

FIG. 2 schematically shows the essential commands of such a shutdown procedure. It can be seen that, after an order to shut down the fuel cell stack (STOP instruction), an automatic fuel cell stack controller starts the shutdown procedure by cutting off the supply of gases, that is to say by closing, for example simultaneously, the cut-off valves 110 and 128.

The current $I_s$ is firstly established at 50 A. From the moment that the voltage V of the fuel cell stack drops below an experimentally chosen threshold value $V_s$ (after about 25 seconds), the controller progressively reduces the current $I_s$ at the same time the fuel cell stack start to drop in voltage.

As long as the voltage of the fuel cell stack is again greater than $V_0$ ($V_0$ being approximately 2 volts), the controller maintains a current $I_s$ being drawn and, by virtue of the signals delivered by the pressure probe (not represented) and by virtue of appropriate circuits, the controller controls the operation of the air booster pump (not represented) in order to maintain a substantially constant pressure in the oxidant gas supply circuit.

As soon as the voltage of the fuel cell stack is no longer greater than 2 V, the controller sends a "Stop air boost", "Interrupt $I_s$," and "Activate $H_2$ suction" order, whereas the pressure is monitored by virtue of the signals delivered by the pressure probe and, from the moment when the pressure of the anode circuit of the fuel cell stack is no longer greater than 0.9 bara, the controller sends a "Stop $H_2$ suction" order.

Figure 3:
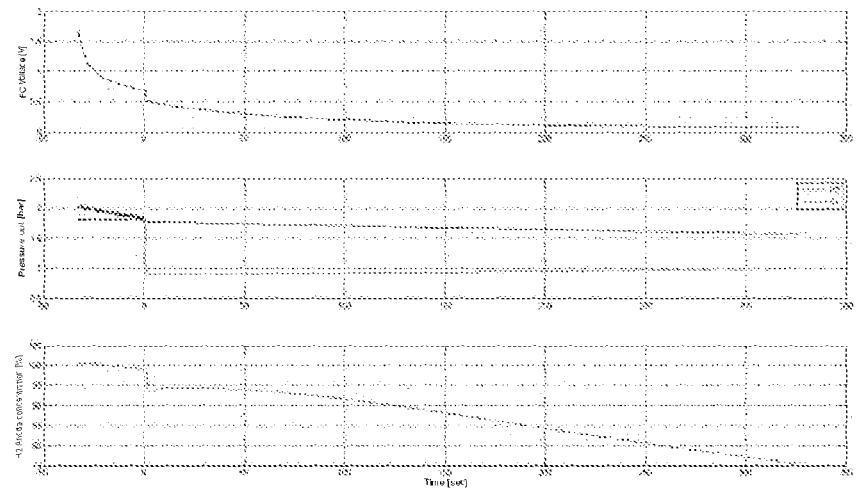
FIG. 3 shows the change in certain parameters of a fuel cell stack after extinction.

Appearing in FIG. 3 is the change in several parameters of the fuel cell stack (16 cells) during an extinction according to the procedure described above. The first curve represents the change in the residual voltage at the terminals of the fuel cell stack, the second curve represents the change in the hydrogen and nitrogen pressure within the fuel cell stack (respectively at the cathode and at the anode), and the third curve shows the change in the hydrogen concentration of the gas present at the anode.

The time 0 on the horizontal axis of the curves corresponds to the time when the extinction procedure is terminated, that is to say the END time as shown in FIG. 2. At this time, as shown in the $2^{nd}$ curve, the hydrogen pressure at the anode is 0.9 bara and the nitrogen pressure at the cathode is 1.8 bara. After extinction, the gases present on either side of the membrane tend to mix together due to the permeability of the latter. Consequently, and as shown in the third curve, the hydrogen concentration at the anode tends to drop, due to diffusion towards the cathode.

After a time, the duration of which depends on the permeability of the membranes, a hydrogen/nitrogen mixture ends up being formed homogeneously at the anode and at the cathode, tending to thus cancel out any residual voltage at the terminals of the fuel cell stack, as shown in the first curve.

Figure 4:
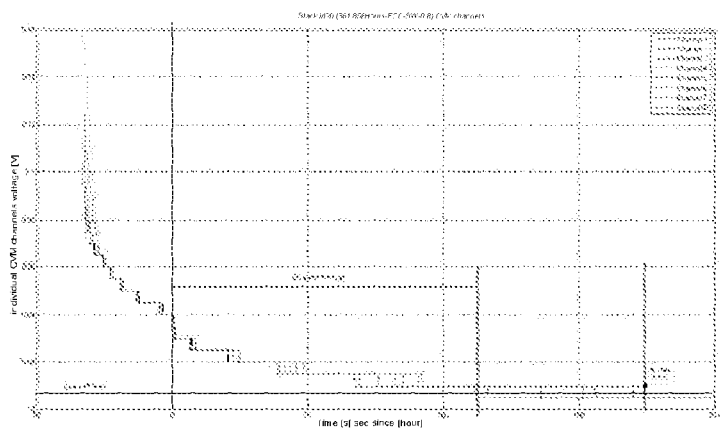
FIG. 4 shows the residual voltage at the terminals of the various cells of a fuel cell stack.

Starting from this observation, a detection procedure according to the invention therefore continuously measures the individual residual voltage at the terminals of each of the cells of the fuel cell stack in which the present invention is carried out. Thus, FIG. 4 illustrates the individual voltages measured on the 16 cells of a fuel cell stack. In the case illustrated here, the voltages are measured in groups of two cells, and FIG. 4 therefore shows 8 measurements corresponding to the eight groups of two cells.

It is specified here that, as mentioned above, the present invention may be carried out either by measuring the voltages at the terminals of a cell, or by measuring the voltages at the terminals of two adjacent cells.

The measurements shown in FIG. 4 are carried out with a resolution of 5 mV. At the time 0, corresponding to the end of the extinction procedure, the voltage measurements are around 40 mV. The gases present on either side of each of the membranes tend to mix together as a function of the respective permeabilities of each of the membranes. The time needed for the cell voltages to drop below a predetermined threshold, represented by a horizontal "low cell level" line in FIG. 4, is then measured. In the example shown in this figure, this threshold is placed at 7.5 mV. The time needed to reach it is referred to as EC_perm_time.

It is recalled here that the dynamic behaviour whereby the residual voltages reach this value reveals the permeability state of the membranes. Indeed, the more permeable the membrane, the more the gases mix together rapidly, and the more the voltages rapidly tend towards a zero value. It is thus seen, in FIG. 4, that the $5^{th}$ measurement reaches the predetermined threshold after an "EC_perm_time" time equal to 112 seconds.

Figure 5:
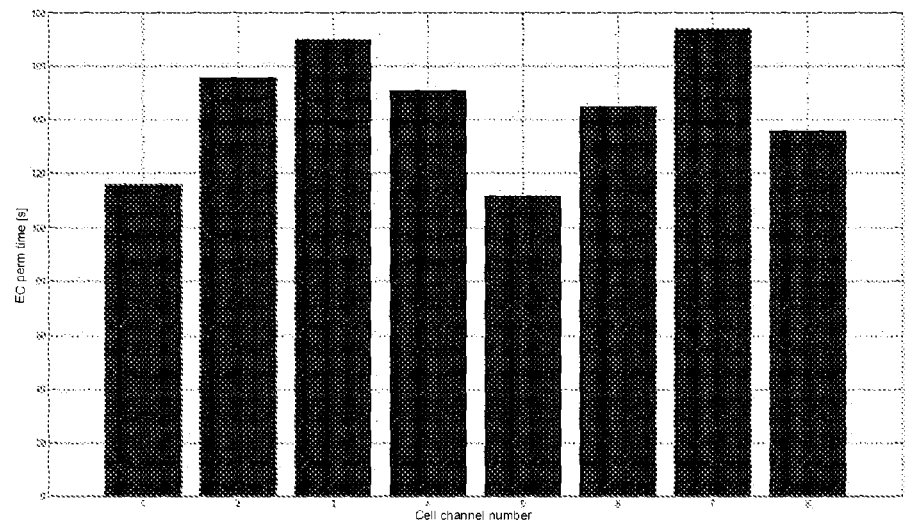
FIG. 5 shows the time values measured within the context of a procedure according to the invention.

FIG. 5 illustrates, on the vertical axis, the time for each of the measurements shown on the horizontal axis. It is observed that the "EC_perm_time" time lies between 112 and 174 seconds for the eight groups of cells.

The "EC_perm_time" time of each cell is then recorded, and two types of control are carried out:
- a comparative instantaneous control, during which each of the EC_perm_time values is compared to the mean of the EC_perm_time values/2, and
- an individual tenancy control during which, for each cell or group of cells, the time is compared to the values stored during previous extinctions.

A permeability defect alarm is then given, either when the EC_perm_time value drops below the mean of the EC_perm_time values/2, or when a new value recorded is at least 25% lower than the mean of the values previously stored for the same cell or the same group of cells.

Figure 6:
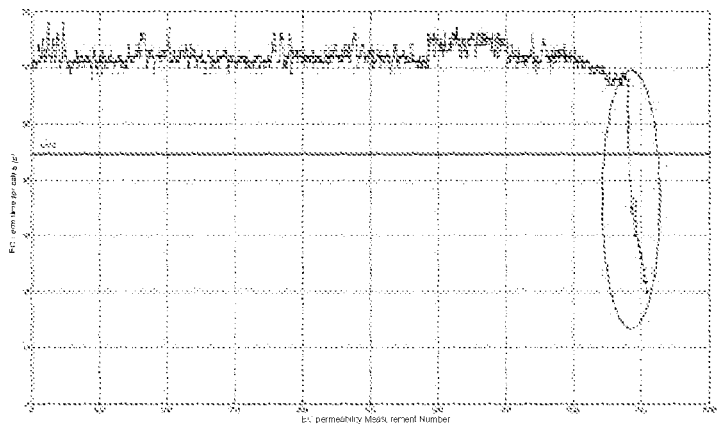
FIG. 6 shows the change in the time values measured within the context of a procedure according to the invention.

FIG. 6 thus illustrates the change in an EC_perm_time value for a given cell over several months of use of a fuel cell stack. The horizontal axis represents the number of the measurement. Each measurement being carried out after an extinction of the fuel cell stack, the number of measurements also represents the number of start-up/shutdown cycles experienced by the fuel cell stack.

The vertical axis represents the EC_perm_time value measured for a cell of the fuel cell stack. The curve illustrates more than 900 consecutive measurements for this same cell. The first 875 measurements lie in a very narrow range of from 57 to 68 seconds. This accuracy is linked in particular to the consistency of the conditions generated by the extinction procedure used.

After the $875^{th}$ measurement, it is observed that the EC_perm_time value begins a very abrupt drop. This rupture reveals a permeability defect in this cell. In practice, the alarm is triggered when the EC_perm_time value drops by 25% compared to the mean value measured from the start of life of the cell, i.e. around 45 seconds in the example from FIG. 6. This value of 45 seconds is represented by the horizontal "limit" line.

Thus, a procedure according to the invention makes it possible to accurately detect a permeability defect on the membrane of the cell illustrated in FIG. 6. Of course, such curves could be presented for all of the cells of the fuel cell stack. Only one example is represented here. The detection procedure therefore enables easy maintenance of the fuel cell stack since it is thus sufficient to replace the defective membrane before restarting the fuel cell stack.

With the aid of this specific example, the systematic nature of this procedure is noted, since the measurements are automatically recorded at each cycle, thus allowing defect detection under the best conditions.

The invention claimed is:
1. A method for detecting a permeability state of a polymeric ion-exchange membrane of a fuel cell stack formed of a stack of electrochemical cells, each cell including an anode and a cathode sandwiching a polymeric ion-exchange membrane therebetween, the fuel cell stack including a fuel gas supply system on an anode side of the electrochemical cells and an oxidant gas supply system on a cathode side of the electrochemical cells, the method comprising, upon each shutdown of the fuel cell stack, steps of:

for each cell of a plurality of cells of the fuel cell stack, continuously measuring a residual voltage at terminals of the cell;

for each cell of the cells, measuring a time interval between a latest shutdown of the fuel cell stack and a moment that the residual voltage measured for the cell drops below a predetermined voltage value;

for each cell of the cells, recording the time interval measured for the cell, and comparing the time interval measured with both of:

(a) previous time intervals measured for previous shutdowns of the cell, and (b) other time intervals measured for the latest shutdown, for other ones of the cells; and, for each cell of the cells, if a difference between the time interval measured for the cell and one of (a) and (b) becomes greater than a predetermined threshold, activating a warning signal that indicates that the fuel cell stack requires an inspection.

2. The method according to claim 1, where a shutdown of the fuel cell stack includes:

(i) cutting off a supply of fuel gas and oxidant gas, and, (ii) as long as an indicator indicates that oxidant gas in the oxidant gas supply system has not been sufficiently consumed such that current continues to be drawn, injecting nitrogen-enriched gas into the oxidant gas supply system.

3. The method according to claim 1, further comprising a step of, before the step of continuously measuring the residual voltage, closing an anode circuit and a cathode circuit of the fuel cell stack.

4. The method according to claim 1, wherein the permeability state relates to a defect in a membrane of one cell of the cells.

5. The method according to claim 1, wherein the permeability state relates to defects in plural membranes of the cells.

6. The method according to claim 1, further comprising a step of maintaining a supply of power to a controller of the fuel cell stack for a predetermined time after each shutdown.

* * * * *

UNITED STATES PATENT AND TRADEMARK OFFICE
CERTIFICATE OF CORRECTION

Page 1 of 1

PATENT NO. : 9,755,254 B2
APPLICATION NO. : 14/651767
DATED : September 5, 2017
INVENTOR(S) : Gino Paganelli et al.

It is certified that error appears in the above-identified patent and that said Letters Patent is hereby corrected as shown below:

On the Title Page

(73) Assignee:

"CAMPAGNIE" should read --COMPAGNIE--.

Signed and Sealed this
Fifth Day of December, 2017

Joseph Matal
*Performing the Functions and Duties of the
Under Secretary of Commerce for Intellectual Property and
Director of the United States Patent and Trademark Office*